US012649809B2

(12) United States Patent
Van Nuffel et al.

(10) Patent No.: US 12,649,809 B2
(45) Date of Patent: Jun. 9, 2026

(54) FOAMS AND METHODS OF FORMING FOAMS OF CHAIN EXTENDED/BRANCHED COPOLYMERS OF VINYLIDENE SUBSTITUTED AROMATIC MONOMERS

(71) Applicant: TRINSEO EUROPE GMBH, Horgen (CH)

(72) Inventors: Claude T.E. Van Nuffel, Oostakker (BE); Abidin Balan, Breda (NL); Luc Bosiers, Edegem (BE)

(73) Assignee: TRINSEO EUROPE GMBH, Pfaeffikon (CH)

( * ) Notice: Subject to any disclaimer, the term of this patent is extended or adjusted under 35 U.S.C. 154(b) by 645 days.

(21) Appl. No.: 17/297,675

(22) PCT Filed: Dec. 3, 2019

(86) PCT No.: PCT/EP2019/083443
§ 371 (c)(1),
(2) Date: May 27, 2021

(87) PCT Pub. No.: WO2020/115026
PCT Pub. Date: Jun. 11, 2020

(65) Prior Publication Data
US 2022/0010088 A1      Jan. 13, 2022

Related U.S. Application Data

(60) Provisional application No. 62/774,481, filed on Dec. 3, 2018.

(30) Foreign Application Priority Data

Sep. 25, 2019    (EP) ..................................... 19199498

(51) Int. Cl.
| | |
|---|---|
| *C08F 212/08* | (2006.01) |
| *C08J 9/00* | (2006.01) |
| *C08J 9/12* | (2006.01) |
| *C08J 9/14* | (2006.01) |
| *C08L 25/06* | (2006.01) |

(52) U.S. Cl.
CPC ........... *C08F 212/08* (2013.01); *C08J 9/0066* (2013.01); *C08J 9/122* (2013.01); *C08F 2800/20* (2013.01); *C08F 2810/50* (2013.01); *C08J 2201/03* (2013.01); *C08J 2325/14* (2013.01)

(58) Field of Classification Search
None
See application file for complete search history.

(56) References Cited

U.S. PATENT DOCUMENTS

| | | | |
|---|---|---|---|
| 2,580,901 A | 1/1952 | Erickson et al. | |
| 2,669,751 A | 2/1954 | McCurdy et al. | |
| 3,160,688 A | 12/1964 | Aykanian et al. | |
| 3,231,524 A | 1/1966 | Simpson | |
| 3,368,008 A | 2/1968 | Azuma | |
| 3,391,051 A | 7/1968 | Ehrenfreund et al. | |
| 3,482,006 A | 12/1969 | Carlson, Jr. | |
| 3,914,191 A | 10/1975 | Scott | |
| 4,312,910 A * | 1/1982 | Suh .......................... C08J 9/141 |
| | | | 521/147 |
| 4,420,448 A | 12/1983 | Krutchen | |
| 5,340,844 A | 8/1994 | Welsh et al. | |
| 5,430,101 A | 7/1995 | Minematsu et al. | |
| 5,473,031 A | 12/1995 | Tinetti et al. | |
| 5,663,252 A | 9/1997 | Pike et al. | |
| 6,117,961 A | 9/2000 | Ogawa | |
| 6,214,945 B1 | 4/2001 | Pike et al. | |
| 6,521,672 B1 | 2/2003 | Glück et al. | |

(Continued)

FOREIGN PATENT DOCUMENTS

| | | |
|---|---|---|
| EP | 0312001 A2 | 4/1989 |
| EP | 1457518 A1 | 9/2004 |

(Continued)

OTHER PUBLICATIONS

Montarnal, Damien, et al., "Silica-Like Malleable Materials from Permanent Organic Networks," Science, vol. 334, No. 6058, Nov. 15, 2011, pp. 965-968.

(Continued)

*Primary Examiner* — Melissa A Rioja
(74) *Attorney, Agent, or Firm* — Young Basile Hanlon & MacFarlane, P.C.

(57) ABSTRACT

A foaming composition useful to make an extruded foam is comprised of: a copolymer of a vinylidene aromatic monomer and an unsaturated compound containing nucleophilic groups, a copolymer of vinylidene aromatic monomer and an unsaturated compound having electrophilic groups; and a blowing agent. The foaming composition may be made into a foam by heating the foaming composition to a temperature sufficient to melt and react said copolymers to form a chain extended/branched copolymer and extruding the foaming composition from a higher pressure to a lower pressure to form an extruded foam comprised of the chain extended/branched copolymer. The foam is comprised of a chain extended/branched copolymer that is the reaction product of (i) a copolymer of one or more vinylidene aromatic monomers and one or more unsaturated compounds containing nucleophilic groups, and (ii) a copolymer of one or more vinylidene aromatic monomers and one or more unsaturated compounds having electrophilic groups.

20 Claims, 2 Drawing Sheets

(56) References Cited

U.S. PATENT DOCUMENTS

| 7,307,105 | B2 | | 12/2007 | Handa et al. | |
| 8,092,727 | B2 | | 1/2012 | Maurer et al. | |
| 9,914,827 | B2 | * | 3/2018 | Ponticiello | C08J 9/0061 |
| 11,370,861 | B2 | * | 6/2022 | Van Nuffel | C08L 25/08 |
| 2006/0016714 | A1 | | 1/2006 | Fregonese et al. | |
| 2007/0100008 | A1 | | 5/2007 | Chang et al. | |
| 2008/0048352 | A1 | | 2/2008 | Nakamura et al. | |
| 2008/0096992 | A1 | | 4/2008 | Maxwell et al. | |
| 2010/0160505 | A1 | * | 6/2010 | Kumazawa | C08L 35/06 |
| | | | | | 525/190 |
| 2012/0046374 | A1 | * | 2/2012 | Scherzer | C08J 9/0066 |
| | | | | | 521/146 |
| 2012/0149793 | A1 | | 6/2012 | Stobby | |
| 2012/0161061 | A1 | | 6/2012 | Hahn et al. | |
| 2014/0288200 | A1 | * | 9/2014 | Smith | C08J 9/147 |
| | | | | | 521/97 |
| 2016/0237233 | A1 | | 8/2016 | Hood et al. | |

FOREIGN PATENT DOCUMENTS

| WO | 2009/134688 | A2 | 11/2009 |
| WO | 2014/063993 | A1 | 5/2014 |
| WO | 2020115026 | A1 | 6/2020 |

OTHER PUBLICATIONS

International Search Report and Written Opinion for co-pending application PCT/EP2019/083443 mailed Mar. 3, 2020 (13 pages).
Tinetti, Journal of Applied Polymer Science, vol. 64, Issue 4, p. 683-687, 1997.

* cited by examiner

Distribution Plots

MW

1

FOAMS AND METHODS OF FORMING FOAMS OF CHAIN EXTENDED/BRANCHED COPOLYMERS OF VINYLIDENE SUBSTITUTED AROMATIC MONOMERS

CROSS-REFERENCE TO RELATED APPLICATION(S)

This application is a 371 application of International Application No. PCT/EP2019/083443, filed on Dec. 3, 2019, which claims priority from European Patent Application No. EP19199498.7 filed Sep. 25, 2019, and U.S. Provisional Application No. 62/774,481, filed Dec. 3, 2018, the entire disclosures of which are hereby incorporated by reference.

TECHNICAL FIELD

This disclosure relates to foams of a co-polymer of vinylidene substituted aromatic monomers and unsaturated compounds containing nucleophilic groups that is extended or branched with a copolymer of vinylidene substituted monomers and unsaturated compounds having pendant electrophilic groups.

BACKGROUND

Extruded polystyrene (XPS) foams have been used for some time in sound and insulation applications. The foams are formed by extruding continuously a heated plastic resin containing a blowing agent through a die, which upon exiting the die expands under, for example, steam or vacuum. XPS foams used in the building industry must have sufficient strength, thermal insulation, heat resistance and solvent resistance. Over the past several years due to environmental concerns the typical HFC blowing agents that realized excellent insulation properties have been phased out resulting in a need for foams with improved insulation properties, which cannot merely be achieved by lowering the density of the foam due to loss of strength. To attempt to address this need polystyrene copolymers having lower thermal conductivities have been employed such as described in DE102004057602 and US20120161061A1. There, however, is still a need for improved insulation while maintaining sufficient strength and heat resistance in the construction industry.

Thus, it would desirable to provide an extruded polystyrene based foam having greater strength for a given density (porosity). Likewise, it would desirable for such a foam to be easily produced in known processes under typical conditions, where the process may realize faster foam line speeds for foams of a given density.

SUMMARY

Applicants have discovered that improved extruded polystyrene based (XPS) foams having improved compressive strength for a given density (porosity) may be made by employing a composition comprised of a vinylidene aromatic monomer and one or more unsaturated compounds containing nucleophilic groups, the copolymer having on average about 0.02 to about 3.0 percent by weight of nucleophilic groups pendant from the copolymer and a copolymer of one or more vinylidene aromatic monomers and one or more unsaturated compounds having electrophilic groups and a blowing agent. In a particular embodiment, the copolymer having nucleophilic groups and the copolymer having electrophilic groups react and chain extend, branch or both during the process of forming the foam. The presence of an amount of such chain extended or branched copolymer may give desirable rheology during the extrusion process allowing the formation of desirable foams. This in turn is believed, without being limiting, may form a high molecular weight tail (>1 million molecular weight "MW") for a given density allowing, for example, greater thermal insulation while still retaining enough strength for demanding applications such as those in the construction industry. This surprisingly allows for the making of extruded foams having greater strengths at a given density (i.e. same density) or having similar strengths at a lower density (i.e., higher porosity). This allows, for example, the ability to make foams at higher throughputs demonstrating similar densities or strengths as foams made from the same copolymers not displaying the branching/chain extension.

A first aspect of the invention is a foaming composition comprising:

(a) one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer;

(b) one or more copolymers of one or more vinylidene aromatic monomers and one or more unsaturated compounds having electrophilic groups; and (c) one or more blowing agents. The composition is useful to make an extruded foam wherein the foaming composition's (a) and (b) components chain extend and branch under typical XPS foam processing conditions.

A second aspect of the invention is a method of forming a foam comprising:

a) heating the foaming composition of the first aspect to a temperature sufficient to melt and react said copolymers to form a chain extended/branched copolymer and b) extruding the foaming composition from a higher pressure to a lower pressure to form an extruded foam comprised of the chain extended/branched copolymer.

A third aspect of the invention is a foam comprised of a chain extended/branched copolymer that is the reaction product of (i) a copolymer of one or more vinylidene aromatic monomers and one or more unsaturated compounds containing nucleophilic groups, the copolymer having on average about 0.02 to about 3.0 percent by weight of nucleophilic groups pendant from the copolymer and (ii) a copolymer of one or more vinylidene aromatic monomers and one or more unsaturated compounds having electrophilic groups. A foam is as commonly understood in the art meaning a body that is cellular. Cellular (foam) herein means the polymer body has a substantially lowered apparent density compared to the density of the polymer and the body is comprised of cells that are closed or open. Closed cell means that the gas within that cell is isolated from another cell by the polymer walls forming the cell. Open cell means that the gas in that cell is not so restricted and is able to flow to another cell without passing through any polymer cell walls to the atmosphere.

DETAILED DESCRIPTION

Figure 1:
FIG. 1 is a GPC molecular weight distribution curve for a foam not of this invention.

The composition useful to make foam is comprised of a blowing agent and a polymer mixture that forms a chain extended/branched polymer. The polymer is comprised of a vinylidene aromatic monomer and one or more unsaturated compounds containing nucleophilic groups, the copolymer having on average about 0.02 to about 3.0 percent by weight of nucleophilic groups pendant from the copolymer and a copolymer of one or more vinylidene aromatic monomers and one or more unsaturated compounds having electrophilic groups. This polymer mixture and chain extended branched polymer is described in U.S. Provisional application 62/774,481, incorporated by reference, and is summarized herein.

The composition is comprised of a blowing agent. The blowing agent may be any suitable physical or chemical blowing agent or combination thereof such as those known in the art. The physical blowing agent may be, for example, any liquid that volatilizes during the formation of a foam such as water, chlorinated hydrocarbon, fluorinated hydrocarbon, chlorofluorinated hydrocarbon, or other volatile hydrocarbon such as ketones, ethers, ester, aldehydes, carboxylic esters, carboxamides or the like or any useful gas such as those present in the atmosphere (oxygen, nitrogen, carbon dioxide, hydrogen, helium and the like) or any combination of the aforementioned. The chemical blowing agent may be any known chemical compound that reacts or decomposes to form a gas at the conditions used to make the foam such as those known in the art. Exemplary chemical blowing agents include sodium bicarbonate and azodicarbonamide as well as those available commercially such as those available under the tradename FOAMAZOL from Bergen International, LLC, East Rutherford, NJ.

The concentration of nucleophilic groups on the copolymers of one or more vinylidene aromatic monomers and one or more unsaturated compounds containing a nucleophilic group, the amount of the copolymers of one or more vinylidene aromatic monomers and one or more unsaturated compounds having pendant electrophilic groups and the concentration of electrophilic groups on the copolymers of one or more vinylidene aromatic monomers and one or more unsaturated compounds having pendant electrophilic groups are chosen such that the copolymers of one or more vinylidene aromatic monomers and one or more unsaturated compounds containing a nucleophilic group is branched and or chain extended and is un-crosslinked.

The nucleophilic groups may be carboxylic acid, hydroxyl, alcohol, phenol, amine, aniline, imidazole, tetrazole, thiol, boronic acid, glycol, hydrazine, hydroxyl amine groups, or mixtures thereof. The nucleophilic groups may be carboxylic acid groups. The electrophilic groups may be one or more of epoxide, anhydride, imide, ester, acyl halide, acyl nitrile, aldehyde, ketone, isocyanate, and isothiocyanate groups or mixtures thereof. The electrophilic groups may be epoxide groups. The chain extended and/or branched copolymer (also chain extended/branched herein) may have polymodal molecular weight distribution. The chain extended and/or branched copolymer may exhibit an $M_z$ from about 300 kg/mole to about 1,000 kg/mole and an $M_w$ from about 100 kg/mole to about 400 kg/mole. The chain extended and/or branched copolymer may exhibit a polydispersity of about 2.5 or greater and about 10 or less.

The composition may further comprise one or more impact modifiers, which may be materials commonly referred to as rubbers. The composition may comprise from about 50 to about 99.5 percent by weight of the chain extended and/or branched copolymer and from about 0.5 to about 50 percent by weight of the impact modifier based on the weight of the composition containing impact modifiers. The composition may comprise a continuous matrix of the chain extended and/or branched copolymer and a dispersed phase comprising rubber. The dispersed phase may comprise particles of about 0.05 to about 10.0 microns. The impact modifier may also be grafted to the copolymers described herein. The copolymers may be grafted to the impact modifier. The impact modifier that is grafted to the copolymer or that the copolymer is grafted to may be polybutadiene.

The polymer composition is reactive and when reacted as disclosed herein form chain extended and/or branched copolymers which are soluble in methylene chloride at 23° C. and which exhibits a polydispersity of 2.5 or greater. The polymer composition comprises; a) from about 90 to about 99.9 weight percent of the copolymer of one or more vinylidene aromatic monomers and one or more unsaturated compounds containing nucleophilic groups; and b) from about 0.1 to about 10.0 weight percent of the copolymer of one or more vinylidene aromatic monomers and one or more unsaturated compounds containing an electrophilic group. The concentration of nucleophilic groups on the copolymer of one or more vinylidene aromatic monomers and one or more unsaturated compounds containing a nucleophilic groups, the amount of the a copolymer of one or more vinylidene aromatic monomers and one or more unsaturated compounds having pendant electrophilic groups and the concentration of electrophilic groups on the a copolymer of one or more vinylidene aromatic monomers and one or more unsaturated compounds having pendant electrophilic groups are chosen such that when the copolymers are reacted they form a copolymer of one or more vinylidene aromatic monomers and one or more unsaturated compounds containing a nucleophilic group is branched and or chain extended and is un-crosslinked. The composition may comprise a metal salt. The metal salt may be of a transition metal, post-transition metal, metalloids, alkaline earth metal or an alkali metal. The metal may be zinc, zirconium, aluminum, calcium, sodium, copper, magnesium or mixtures thereof. The metal may be zinc. The metal may form a salt with an acetate, carbonate, bicarbonate, methacrylate, fumarate or mixtures thereof. The mole ratio of metal salts to nucleophilic groups on the copolymer of one or more vinylidene aromatic monomers and one or more unsaturated compounds containing nucleophilic groups may be about 20:1 to 1:20, or about 10:1 to 1:10.

When forming the foams herein the copolymers of one or more vinylidene aromatic monomers and one or more unsaturated compounds containing nucleophilic groups, the copolymer having about 0.02 to about 3.0 percent by weight of nucleophilic groups pendant from the copolymer, with one or more copolymers of one or more vinylidene aromatic monomers and one or more unsaturated compounds having pendant electrophilic groups; at a temperature of about 200° C. to about 300° C. for a time period of about 0.5 to about 5 minutes wherein the copolymer of one or more vinylidene aromatic monomers and one or more nucleophilic groups is chain extended and or branched by the copolymer of one or more vinylidene aromatic monomers and one or more unsaturated compounds having electrophilic groups and the chain extended and/or branched copolymer is soluble in methylene chloride at 23° C. and exhibits a polydispersity of 2.5 or greater. The copolymer of one or more vinylidene aromatic monomers and one or more unsaturated compounds having pendant electrophilic groups is present in an amount of from about 0.1 to about 10 percent by weight of the mixture that is melt blended. The composition to be melt blended may contain one or more metal salts, as disclosed herein. The mole ratio of the metal salt to nucleophilic groups on the copolymer of one or more vinylidene aromatic monomers and one or more unsaturated compounds containing nucleophilic groups in the composition melt blended may be about 20:1.0 to about 1.0:20.

The chain extended and or branched copolymers disclosed are soluble in methylene chloride at 23° C. and exhibits a polydispersity of 2.5 or greater, about 3.2 or greater and about 4.5 or greater, and about 10 or less. The chain extended and or branched copolymers may have polymodal molecular weight distribution. The chain extended and or branched copolymers may exhibit an $M_z$ from about 300 kg/mole to about 1,000 kg/mole and an $M_w$ of from about 100 kg/mole to about 400 kg/mole. The chain extended and or branched copolymers disclosed may exhibit a melt viscosity at $0.314 \text{ s}^{-1}$ angular frequency of at least 10 percent higher than the same polymer without branching and chain extension when measured at 200° C. and may be at least 20%, 50% or even 100% higher. The chain extended polymer while having a desirable at low shear, the viscosity at high shears (i.e., $628 \text{ s}^{-1}$) may be essentially the same (e.g., less than 10% different). The chain extended or branched copolymers as a result of their above desirable rheological properties tend to have a higher viscosity ratio (low shear viscosity "$0.314 \text{ s}^{-1}$"/higher shear viscosity "$628 \text{ s}^{-1}$") than the same polymer without extension or branching. Generally, the viscosity ratio is at least 25, 30 or 40 or even 50 or higher for the branched or chain extended polymer, whereas for the same polymer lacking such, the viscosity ratio tends to be about 20 or less. The chain extended and/or branched copolymers exhibit excellent processability and provide foams with optimized foam density, thermal conductivity and compressive strength.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Disclosed are copolymers of one or more vinylidene aromatic monomers and one or more unsaturated compounds containing a nucleophilic group, the copolymers having on average about 0.02 to about 3.0 percent by weight of nucleophilic groups pendant from the copolymer, the copolymers being chain extended and or branched by a copolymer of one or more vinylidene aromatic monomers and one or more unsaturated compounds containing electrophilic groups wherein the chain extended and/or branched copolymers are soluble in methylene chloride at 23° C. and exhibit a polydispersity of 2.5 or greater. The concentration of nucleophilic groups on the copolymers of one or more vinylidene aromatic monomers and one or more unsaturated compounds containing a nucleophilic group, the amount of the copolymers of one or more vinylidene aromatic monomers and one or more unsaturated compounds having pendant electrophilic groups and the concentration of electrophilic groups on the copolymers of one or more vinylidene aromatic monomers and one or more unsaturated compounds having pendant electrophilic groups are chosen such that the copolymers of one or more vinylidene aromatic monomers and one or more unsaturated compounds containing a nucleophilic group are branched and or chain extended and are un-crosslinked. Disclosed is a composition comprising: a) a copolymer of one or more vinylidene aromatic monomers and one or more unsaturated compounds containing a nucleophilic group, the copolymer having on average about 0.02 to about 3.0 percent by weight of nucleophilic groups pendant from the copolymer; and b) a copolymer of one or more vinylidene aromatic monomers and one or more unsaturated compounds containing electrophilic groups. The composition may comprise a metal salt which catalyzes the reaction of the two polymers. The composition is reactive and when reacted as disclosed herein form chain extended and/or branched copolymers which are soluble in methylene chloride at 23° C. and which exhibits a polydispersity of 2.5 or greater.

One or more as used herein means that at least one, or more than one, of the recited components may be used as disclosed. As used herein percent by weight or parts by weight refer to, or are based on, the weight of the compositions unless otherwise specified.

Chain-extended as used herein means that two or more of the subject copolymers are linked by another copolymer to form linear segments of the subject copolymers. The subject copolymers may be one or more copolymers of one or more vinylidene aromatic monomers and one or more unsaturated compounds containing a nucleophilic group. The linking copolymer may be one or more copolymers of one or more vinylidene aromatic monomers and one or more unsaturated compounds having electrophilic groups. Branched as used herein means that more than two of the subject copolymers are linked by another copolymer such that the subject polymers are formed having three or more connected chains that are not linear and form non-linear branches. The compositions disclosed may include polymer chains wherein a portion of the subject polymers are chain extended and a portion of the subject polymers are branched by the linking polymers. As used herein un-crosslinked means that the subject polymers do not have multiple crosslinks such that the resulting polymer composition becomes insoluble in solvents, for instance methylene chloride at 23°.

The copolymers of one or more copolymers of one or more vinylidene aromatic monomers and one or more unsaturated compounds containing one or more nucleophilic groups are addition polymers formed by addition polymerization through unsaturated groups. The copolymers are chosen such that the concentration of nucleophilic groups present such that when such compounds are reacted with one or more copolymers of one or more vinylidene aromatic monomers and one or more unsaturated compounds having electrophilic groups polymers chain extended and/or branched copolymers are formed. The relative concentrations of nucleophilic groups and electrophilic groups in the reacted polymers are selected such that the copolymers react to form chain extended and/or branched polymers. If the concentration of both nucleophilic groups and electrophilic groups in the polymers is too high the resulting copolymers become crosslinked with multiple links between the reacted polymers. At least one of the two reacted polymers must have a limited number of groups to prevent crosslinking such that the resulting product is un-crosslinked. Chain extended and or branched polymers which are un-crosslinked are processable into desired products and provide the advantages discussed hereinbefore. There are a number of known copolymers of one or more vinylidene aromatic monomers and one or more unsaturated compounds having electrophilic groups which have a significant concentration of electrophilic groups and copolymers of one or more vinylidene aromatic monomers and one or more unsaturated compounds containing one or more nucleophilic groups having a high concentration of nucleophilic groups. When one of the reacted copolymers has a high concentration of either nucleophilic or electrophilic groups then the other copolymer reacted with such copolymers should have a low concentration of nucleophilic groups or electrophilic groups to allow formation of chain extended and/or branched polymer chains. At least 50% of the formed polymer chains may be un-crosslinked. Typically a small amount of crosslinking may take place, but this amount involves, for example, no more than about 10% or 5% of the aforementioned copolymers are crosslinked. The amount crosslinking may be determined from the amount of polymer that fails to be dissolved when performing, for example, gel permeation chromatography (GPC) to determine the molecular weight of the polymer.

The formed chain extended and/or branched (also referred to herein as "chain extended/branched copolymer") copolymers may have polymodal molecular weight distribution. Polymodal means that the polymer mixture contains more than one molecular weight peak when the molecular weight is measured. In essence this means that the mixture shows a number of molecular weight distribution peaks at multiples of the average molecular weight of the chain extended copolymers of one or more vinylidene aromatic monomers and one or more unsaturated compounds containing a nucleophilic group. The polymer molecular weight may be measured by gel permeation chromatography (GPC) using narrow molecular weight polystyrene standards and tetrahydrofuran (THF) as solvent, standard integrating software is used together with a UV-detector.

There are several commercially available copolymers of one or more vinylidene aromatic monomers and one or more unsaturated compounds having electrophilic groups having relatively high concentrations of electrophilic groups. When these copolymers are used to chain extend and or branch copolymers of one or more vinylidene aromatic monomers and one or more unsaturated compounds containing nucleophilic groups, the concentration of the nucleophilic groups on the copolymer may be relatively low. The concentration of the nucleophilic groups on the one or more copolymers of one or more vinylidene aromatic monomers and one or more unsaturated compounds containing a nucleophilic group are chosen such that based on the concentration of electrophilic groups on the branched by one or more copolymers of one or more vinylidene aromatic monomers and one or more unsaturated compounds having electrophilic groups when the copolymers are reacted chain extended and or branched, un-crosslinked polymers are prepared. The concentration of the nucleophilic groups on the one or more copolymers of one or more vinylidene aromatic monomers and one or more unsaturated compounds containing a nucleophilic group may be about 0.02 percent by weight of the copolymer or greater, about 0.03 percent by weight or greater or about 0.04 percent by weight or greater. The concentration of the nucleophilic groups on the one or more copolymers of one or more vinylidene aromatic monomers and one or more unsaturated compounds containing nucleophilic groups may be about 3.0 percent by weight of the copolymer or less, about 1.5 percent by weight or less, about 0.5 percent by weight or less, or 0.25 percent by weight or less. The concentration of the nucleophilic groups on the one or more copolymers of one or more vinylidene aromatic monomers and one or more unsaturated compounds containing nucleophilic groups may be less than 0.25 percent by weight.

The concentration of the electrophilic groups on the one or more copolymers of one or more vinylidene aromatic monomers and one or more unsaturated compounds containing electrophilic groups are chosen such that based on the concentration of nucleophilic groups on the one or more copolymers of one or more vinylidene aromatic monomers and one or more unsaturated compounds having nucleophilic groups when the copolymers are reacted chain extended and or branched, un-crosslinked polymers are prepared. The concentration of the electrophilic groups on the one or more copolymers of one or more vinylidene aromatic monomers and one or more unsaturated compounds containing a electrophilic group may be about 1 percent by weight of the copolymer or greater, about 15 percent by weight or greater or about 20 percent by weight or greater. The concentration of the electrophilic groups on the one or more copolymers of one or more vinylidene aromatic monomers and one or more unsaturated compounds containing an electrophilic group may be about 60 percent by weight of the copolymer or less, about 50 percent by weight or less or about 40 percent by weight or less. The concentration that is desired tends to be inversely proportional with the weight average molecular weight ($M_w$) of the copolymer. Illustratively, if the $M_w$ is about 200,000 (e.g., 150,000 to 400,000 g/mole) then a typically useful amount may be in the single digits such as 5% or 1%, whereas if the $M_w$ is on the order of 10,000 (e.g., 5000 to 20,000) the useful amount may be on the order of 20%.

The equivalents ratio of electrophilic groups on the one or more copolymers of one or more vinylidene aromatic monomers and one or more unsaturated compounds containing an electrophilic group to the nucleophilic groups on the copolymers of one or more vinylidene aromatic monomers and one or more unsaturated compounds containing a nucleophilic group is chosen such that when the copolymers are reacted chain extended and or branched, un-crosslinked polymers are prepared. Equivalents as used in this context means the number of electrophilic groups or nucleophilic groups available to react with the other. To form the chain extended and or branched copolymers the nucleophilic groups react electrophilic groups. The extent of reaction and chain extension, branching and crosslinking is controlled by the amount of the lowest amount of the nucleophilic or electrophilic groups. The amount of nucleophilic groups may be the limiting reactive group. The amount of electrophilic groups may be the limiting reactive group. The equivalents ratio of electrophilic groups to nucleophilic groups may be about 0.1:1.0 or greater, about 0.3:1.0 or greater or 0.5:1.0 or greater. The equivalents ratio of electrophilic groups to nucleophilic groups may be about 10:1 or less, about 4:1 or less or 2:1 or less.

The copolymers disclosed herein contain vinylidene substituted aromatic monomers. Vinylidene substituted aromatic monomers comprise vinylidene, alkenyl groups, bonded directly to aromatic structures. The vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinylidene substituted aromatic monomers include styrene, alpha methyl styrene, N-phenyl-maleimide and chlorinated styrenes; or alpha-methyl styrene and styrene. The vinylidene substituted aromatic monomers may be mono-vinylidene aromatic monomers, which contain one unsaturated group. Vinylidene aromatic monomers include but are not limited to those described in U.S. Pat. Nos. 4,666,987; 4,572,819 and 4,585,825, which are herein incorporated by reference. The monomer may correspond to the formula:

$$Ar \left( \underset{\underset{C}{\overset{R^1}{|}}{=} CH_2 \right)_n$$

Wherein $R^1$ is separately in each occurrence hydrogen or methyl; and

Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinylidene substituted aromatic monomers may be present in the copolymers in a sufficient amount such that the polymer exhibits the advantageous properties associated with polymers of vinylidene substituted aromatic monomers, for instance polystyrene. The advantageous properties of polymers of vinylidene substituted monomers include processability, stiffness, and thermal stability. The copolymers of one or more vinylidene aromatic monomers and one or more unsaturated compounds containing a nucleophilic group may contain vinylidene substituted aromatic monomers in an amount of about 90 percent by weight of the copolymers or greater, about 95 percent by weight or greater or about 96 percent by weight or greater. The copolymers of one or more vinylidene aromatic monomers and one or more unsaturated compounds containing a nucleophilic group may contain vinylidene substituted aromatic monomers in an amount of about 99.98 percent by weight of the polymerizable compositions or copolymers or less, about 99.97 percent by weight or less or about 99.96 percent by weight or less. The copolymers one or more copolymers of one or more vinylidene aromatic monomers and one or more unsaturated compounds having electrophilic groups may contain vinylidene substituted aromatic monomers in an amount of about 40 percent by weight of the polymerizable compositions or copolymers or greater, about 50 percent by weight or greater or about 60 percent by weight or greater. The one or more copolymers of one or more vinylidene aromatic monomers and one or more unsaturated compounds having electrophilic groups may contain vinylidene substituted aromatic monomers in an amount of about 90 percent by weight of the polymerizable compositions or copolymers or less, about 85 percent by weight or less or about 80 percent by weight or less. The recited amounts may relate to the amounts of vinylidene substituted aromatic monomers.

The compositions may contain branching agents commonly used in vinylidene aromatic based polymers. The branching agents may be vinylidene substituted aromatic monomers having 2 or more vinylidene groups. Other branching agents may include other bifunctional and in general multifunctional (functionality >2) monomers, multifunctional initiators and multifunctional chain transfer agents and the like. The branching agents may be present in polymerizable compositions in an amount of about 0.001 percent by weight of the composition or greater, about 0.002 percent by weight or greater or about 0.003 percent by weight or greater. The branching agents may be present in polymerizable compositions in an amount of about 0.5 percent by weight of the composition or less, about 0.2 percent by weight or less or about 0.1 percent by weight or less.

The one or more copolymers of one or more vinylidene aromatic monomers and one or more unsaturated compounds containing one or more nucleophilic groups comprise the addition reaction product of one or more vinylidene aromatic monomers and one or more unsaturated compounds containing one or more nucleophilic groups. The one or more unsaturated compounds containing one or more nucleophilic groups may contain one nucleophilic groups. The copolymers may contain more than one different nucleophilic group or may contain only one species of nucleophilic group. The copolymers may be prepared from more than one unsaturated compound each containing different type of nucleophilic group. The copolymers may be prepared from one species of unsaturated compounds each containing the same nucleophilic group. The one or more copolymers of one or more vinylidene aromatic monomers and one or more unsaturated compounds containing one or more nucleophilic groups may contain a mixture of copolymers which contain polymer chains of differing amounts of nucleophilic groups. Some polymer chains may contain 2 nucleophilic groups, 1 nucleophilic group or 0 nucleophilic groups. The polymer chains in the mixture may contain on average less than 2 nucleophilic groups per chain, 1 nucleophilic group per chain or 0.8 nucleophilic groups per chain. The mixture contains on average greater than 0 nucleophilic groups per chain or 0.05 or greater nucleophilic groups per chain. The nucleophilic groups may be pendant from the chain of the copolymer.

The one or more unsaturated compounds containing nucleophilic groups may contain any nucleophilic group that reacts with an electrophilic group under the conditions described herein. Nucleophilic group as used herein is a group which donates an electron pair to make a covalent bond. Exemplary nucleophilic groups include carboxylic acid, alcohol, phenol, amine, aniline, imidazole, tetrazole, thiol, boronic acid, glycol, hydrazine and hydroxyl amine groups. Nucleophilic groups may be carboxylic acid groups. The one or more unsaturated compounds containing nucleophilic groups may be (meth) acrylic acids, (meth)acrylates, hydroxyalkyl methacrylates, and the like. The one or more unsaturated compounds containing nucleophilic groups may be methacrylic acid and or acrylic acid.

The one or more unsaturated compounds containing electrophilic groups may contain any electrophilic group that reacts with a nucleophilic group under the conditions described herein. Electrophilic group as used herein is a group which receives an electron pair to form a covalent bond. Exemplary electrophilic groups include epoxide, anhydride, imide, ester, acyl halide, acyl nitrile, aldehyde, ketone, isocyanate and isothiocyanate groups. Electrophilic groups may be epoxide groups. The one or more unsaturated compounds containing electrophilic groups may be glycidyl (meth)acrylates, and the like.

The copolymers disclosed herein may further comprise one or more (meth)acrylates. (Meth) acrylate as used herein refers to compounds having a vinyl group bonded to the carbonyl moiety of an alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. (Meth)acrylates useful include those that correspond to the formula:

$$R^b O - \overset{\overset{\displaystyle O}{\|}}{C} - \overset{\overset{\displaystyle R^a}{|}}{C} = CH_2$$

wherein $R^a$ is separately in each occurrence H or —CH$_3$; and $R^b$ may be a $C_1$ to $C_{-30}$ alkyl group or $C_{1-10}$ alkyl group. Examples of the one or more (meth)acrylates include lower alkyl (meth)acrylates, such as methyl (meth)acrylate, ethyl (meth)acrylate, propyl (meth)acrylate, butyl (meth)acrylate, pentyl (meth)(acrylate) and hexyl (meth) acrylate. The one or more (meth)acrylates in the polymerizable composition may be present in sufficient amount to provide the desired properties of the copolymer such as processability, practical toughness, refractive index, environmental stress crack resistance, hydrolytic stability, thermal stability, UV stability, impact resistance, weatherability, and the like. The copolymers disclosed herein contain (meth)acrylates in an amount of about 0 percent by weight of the copolymers or greater, about 1 percent by weight or greater or about 2 percent by weight or greater. The polymerizable compositions and copolymers disclosed herein contain (meth)acrylates in an amount of about 20 percent by weight of the copolymers or less, about 15 percent by weight or less, about 10 percent by weight or less, about 8 percent by weight or less or about 5 percent by weight or less.

The copolymers may further comprise one or more unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles are used in the copolymers to enhance the glass transition temperature, transparency, chemical resistance and the like. The copolymers disclosed herein may contain one or more unsaturated nitriles in an amount of about 0 percent by weight of the copolymers or greater, about 1 percent by weight or greater or about 2 percent by weight or greater. The copolymers disclosed herein may contain one or more unsaturated nitriles in an amount of about 40 percent by weight of the copolymers or less, about 35 percent by weight or less, about 30 percent by weight or less or about 20 percent by weight or less.

Other vinyl monomers may also be included in the copolymers, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI), and the like. These additional comonomers can be incorporated in to the composition in several ways including, interpolymerization with the vinylidene substituted aromatic containing copolymer and/or polymerization into polymeric components which can be combined, for example blended in to the matrix. If present, the amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The compositions disclosed may contain impact modifiers. The terms impact modifiers and rubbers are used interchangeably herein. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, and mixtures thereof. Also suitable are interpolymers of rubber-forming monomers with other copolymerizable monomers. The rubbers may be present in the formulated composition in sufficient amount to provide the desired impact properties to the composition. Desired impact properties include increased izod, charpy, gardner, tensile, falling dart, and the like. The compositions disclosed herein contain impact modifiers (rubbers) in an amount of about 0.5 percent by weight of the compositions or greater, about 1 percent by weight or greater or about 2 percent by weight or greater. The compositions disclosed herein contain impact modifiers (rubbers) in an amount of about 50 percent by weight of the compositions or less, about 45 percent by weight or less, about 40 percent by weight or less, about 30 percent by weight or less, about 20 percent by weight or less or about 10 percent by weight or less. The compositions disclosed herein contain the copolymer in an amount of about 0.5 percent by weight of the compositions or greater or 50 percent by weight of the compositions or greater. The compositions disclosed herein contain copolymer in an amount of about 99.5 percent by weight of the compositions or less, 90 percent by weight of the compositions or less, 80 percent by weight of the compositions or less or 50 percent by weight of the compositions or less. Compositions, formulated compositions, as used in this context are the formulated compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a cis content equal to or less than 99 percent or less than 97 percent. The cis content of the diene rubber may be equal to or greater than 20 percent or greater than 37 percent wherein the cis weight percent is based on the weight of the diene rubber. The rubber may be a 1,3-butadiene rubber having at least about 1 weight percent 1,2-vinyl or at least about 7 weight percent 1,2-vinyl based on the weight of the 1,3-butadiene rubber. The 1,3-butadiene rubber may have less than or equal to about 30 weight percent 1,2-vinyl or less than or equal to about 13 weight percent 1,2-vinyl based on the weight of the 1,3-butadiene rubber. The diene rubber may have a weight average molecular weight of at least about 100 kilogram per mole (kg/mole)- or a weight average molecular weight of at least about a 300 kg/mole. The diene rubber may have a weight-average molecular weight equal to or less than about 900 kg/mole or a weight average molecular weight equal to or less than 600 kg/mole. The diene rubber having a solution viscosity of at least 10 centi Stokes (cSt) (10 percent (%) solution in styrene) or a solution viscosity of about 30 cSt. The diene rubber may have a solution viscosity equal to or less than about 500 cSt or equal to or less than about 400 cSt. The rubber, with graft and/or occluded polymers if present, is dispersed in the continuous matrix phase as discrete particles. The rubber particles may comprise a range of sizes having a mono-modal, bimodal, or multimodal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01. by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of NH₄SCN in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (µm), equal to or greater than about 0.1 microm- eters, and about 0.5 micrometers. The average particle size of the rubber particles may be equal to or less than about 10 micrometers, preferably equal to or less than about 5 micrometers, or equal to or less than about 4 micrometers.

The disclosed compositions may also optionally contain one or more additives that are commonly used in compositions of this type. Such additives of this type include, but are not limited to: ignition resistant additives, stabilizers, colorants, antioxidants, antistats, silicon oils, flow enhancers, mold releases, etc. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof. If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

Disclosed are various techniques for producing the copolymers. Examples of these known polymerization processes include bulk, mass-solution, or mass-suspension polymerization, generally known as mass polymerization processes. For a good discussion of how to make monovinylidene aromatic copolymer containing compositions see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243,481; and 4,239,863, which are incorporated herein by reference. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. Alternatively, a parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example butadiene rubber may be dissolved in the mixture monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed A feed with a functional monomer such as N-phenyl maleimide that increases the Tg of the matrix and also the heat resistance of the product can be added in one or more location throughout the polymerization process, the location(s) may be the same or different from where the co-monomers are added, for example see U.S. Pat. Nos. 5,412,036 and 5,446,103, which are incorporated herein by reference.

A feed with a functional additive such as ethylene-bisstearamide, dialkyladipates, polydimethylsiloxane, or other lubricants or release agents that increases the processability of the product can be added in one or more location throughout the polymerization, devolatilization and conveying process, the location(s) may be the same or different from where the co-monomers are added.

When a desirable monomer conversion level and a matrix copolymer of desired molecular weight distribution is obtained, where rubber is present, the polymerization mixture may then be subjected to conditions sufficient to cross-link the rubber and remove any unreacted monomer and solvent. Such cross-linking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. Thereafter the polymer may be extruded, and bulk pellets obtained from a pelletizer.

The temperatures at which polymerization is conducted are dependent on a variety of factors including the specific initiator and type and concentration of rubber, comonomers, reactor set-up (for example, linear, parallel, recirculation, etc.), and reaction solvent, if any, employed. Polymerization temperatures from 60° C. to 160° C. may be employed prior to phase inversion with temperatures from 100° C. to 200° C. being employed subsequent to phase inversion. Mass polymerization at such elevated temperatures is continued until the desired conversion of monomers to polymer is obtained. Generally, conversion (also sometimes referred to as percent solids) of from 55 to 90, or 60 to 85, weight percent of the monomers added to the polymerization system (that is, monomers added in the feed and any additional stream, including any recycle stream) to polymer is desired. Percent solids is the ratio of the weight of the solids (for example, rubber plus matrix (co)polymer) to the weight of the reaction mixture (for example, unpolymerized monomer(s)) expressed in percent at any specified time during the polymerization reaction.

To synthesize rubber-modified copolymers with high performance by the mass process, four aspects are important among many others. These aspects are grafting of the rubber substrate prior to phase inversion, rubbery domain and/or particle formation or sizing during phase inversion, building molecular weight and molecular weight distribution of the matrix, and cross-linking of the rubber particle at the completion point of the mass polymerization. Alternatively, a combination of mass and suspension polymerization techniques are employed. Using these techniques, following phase inversion and subsequent size stabilization of the rubber particles, the partially polymerized product can be suspended with or without additional monomers in an aqueous medium which contains a polymerized initiator and polymerization subsequently completed. The rubber-modified copolymer is subsequently separated from the aqueous medium by acidification, centrifugation or filtration. The recovered product is then washed with water and dried.

A polymer's molecular weight is directly related to the entanglement effects contributing to its rheological and physical properties. The molecular weight of the matrix copolymer produced in the grafting reactor during the production of the rubber-modified vinylidene aromatic substituted copolymer can be adjusted by the addition of a suitable chain transfer agent. Chain transfer agents, or molecular weight regulators, are substances which can undergo atom or group transfer or an addition-elimination. Organic molecules with labile hydrogens and are well known, for example, alpha-methyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as allyl peroxides, allyl halides, allyl sulfides, and terpenes such as terpinoline. Also transition metal complexes as cobalt(II) porphyrin complexes can be used as transfer agent. Chain transfer agents are added in an amount from about 0.0001 to 10 weight percent based on the weight of the reaction mixture (that is, rubber, monomer(s), and solvent, if any). The chain transfer agent may be added in an amount equal to or greater than about 0.001 weight percent, about 0.002, or about 0.003 weight percent based on the weight of the reaction mixture. The chain transfer agent may be added in an amount equal to or less than about 0.5 weight percent, about 0.2, or about 0.1 weight percent based on the weight of the reaction mixture.

The chain transfer agent may be added all at once in one reactor zone or it may be added in two or more reactor zones. Chain transfer agent may be added before phase inversion, during rubber particle sizing, more may be added after particle sizing to help control the matrix molecular weight, and optionally more may be added later to fine tune the matrix molecular weight/molecular weight distribution. The chain transfer agent may be added at the beginning of the polymerization (in other words, at a time where the percent solids for the reaction mixture is equal to the weight percent rubber) in a first amount equal to or greater than 0.001 weight percent, from about 0.002 and about 0.1 weight percent, or from about 0.003 and about 0.05 weight percent based on the weight of the reaction mixture. The amount of chain transfer agent added later, for example after about 40 percent solids, 30 percent solids, is added in a second amount equal to or less than about 0.7 weight percent, about 0.001 to about 0.6 weight percent, or from about 0.002 to about 0.5 weight percent based on the weight of the reaction mixture. The molecular weight of the matrix copolymer depends on, among other things, how much chain transfer agent is used and when it is added.

The monomers and optionally rubber or rubber precursors in the reaction mixture may be dissolved or dispersed in an inert solvent. Useful solvent families are aromatics, ketones, alkanes. An exemplary solvent is ethyl benzene. The solids level of monomers and rubbers or rubber precursors in the solvent may be chosen to facilitate efficient formation of the copolymer and optionally dispersed rubber in the copolymer. Solids level as used in this context is the amount of the monomers and optionally rubber in the reaction mixture expressed as weight percent. The solids level of monomers and optionally rubber or rubber precursors in the reaction mixture is about 60 percent by weight or greater based on the reaction mixture, is about 65 percent by weight or greater or is about 70 percent by weight or greater. The solids level of monomers and optionally rubber or rubber precursors in the reaction mixture is about 95 percent by weight or less based on the reaction mixture, is about 90 percent by weight or less or is about 85 percent by weight or less.

The residence time of the reaction mixture in the reactors is sufficient to prepare copolymers having the desired molecular weight. The residence time of the reaction mixture in the reactors may be about 1 hour or greater, about 1.5 hours or greater or about 2 hours or greater. The residence time of the reaction mixture in the reactors may be about 10 hours or less, about 9 hours or less or about 8 hours or less. The molecular weight of the copolymer may be about 100 kg/mole or greater, about 120 kg/mole or greater or about 140 kg/mole or greater. The molecular weight of the copolymer may be about 400 kg/mole or less, about 350 kg/mole or less or about 325 kg/mole or less. Molecular weight is determined by gel permeation chromatography using polystyrene standards.

The process may be performed in the presence of a radical initiator. Any radical initiator that enhanced the formation of the copolymers may be used. Exemplary classes of initiators include free radical initiators such as peroxide and azo compounds which will accelerate the polymerization of the vinyl aromatic monomer. Exemplary initiators include but are not limited to tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobis-cyclohexanecarbo-nitrile, azobismethyl isolactate and azo-biscyanovalerate. Typical amounts are well known in the art and may be used in the disclosed process. The radical initiators may be utilized in a sufficient amount to enhance the polymerization of the monomers to form a copolymer, including increasing the rate of polymerization. Initiators may be employed in a range of concentrations dependent on a variety of factors including the specific initiators employed, the desired levels of polymer grafting and the conditions at which the mass polymerization is conducted, such as from 50 to 2000, preferably from 100 to 1500, parts by weight of the initiator are employed per million parts by weight of monomers. The radical initiators may be present in an amount of about 0.001 percent by weight or greater based on the weight of the monomers present, about 0.002 percent by weight or greater or about 0.003 percent by weight or greater. The radical initiators may be present in an amount of about 0.1 percent by weight or less based on the weight of the co-monomers present, about 0.08 percent by weight or less or about 0.05 percent by weight or less.

Disclosed is a composition useful for preparing chain extended/branched copolymers of one or more vinylidene aromatic monomers and one or more unsaturated compounds containing nucleophilic groups, the copolymer having on average about 0.02 to about 3.0 percent by weight of nucleophilic groups pendant from the copolymer. The chain extended and or branched copolymers may be un-cross-linked. The composition comprises: a) one or more copolymers of one or more vinylidene aromatic monomers and one or more unsaturated compounds containing a nucleophilic group, the copolymer having on average about 0.02 to about 3.0 percent by weight of nucleophilic groups pendant from the copolymer; and b) one or more copolymers of one or more vinylidene aromatic monomers and one or more unsaturated compounds having electrophilic groups. The two parts may be kept separate until formation of the chain extended and or branched copolymers of one or more vinylidene aromatic monomers and one or more unsaturated compounds containing a nucleophilic group is desired. The formation of the chain extended and or branched copolymers of one or more vinylidene aromatic monomers and one or more unsaturated compounds containing a nucleophilic group may take place at a time and place remote from preparation of the copolymers. The chain extended and or branched copolymers may be formed by contacting the components. The components may be contacted under conditions disclosed herein to form an XPS foam.

The uncontacted composition may include a metal salt. The metal salt may reduce the temperature at which the chain extended and or branched copolymers may be formed. The metal salt may function as a catalyst for the formation of the chain extended and or branched copolymers. Any metal salt that catalyzes or reduces the temperature required for formation of the chain extended and or branched copolymers may be utilized. The metal salt may be the salt of a transition metal, an alkali metal, an alkaline earth metal, a post transition metal or a metalloid. The metal in the salt may be zinc, zirconium, aluminum, calcium, sodium, copper, magnesium or mixtures thereof. The metal in the salt may be zinc. The metal may form a salt with an acetate, carbonate, bicarbonate, methacrylate, fumarate counter ion, or mixtures thereof. The metal may form a salt with an acetate counter ion. The metal salt may be zinc acetate, zinc acetate dihydrate, zinc carbonate, and the like.

The metal salt may be present in a sufficient amount to catalyze or reduce the temperature required for formation of the chain extended and or branched copolymers may be utilized. The metal salt may be present in the reactive composition disclosed in a mole ratio relative to the one or more vinylidene aromatic monomers and one or more unsaturated compounds containing a nucleophilic group of about 20:1 to about 1:20, 10:1 to 10:1 or 5:1 to 1:5. The metal salt may be present in the reactive composition in an amount of about 10 ppm or greater based on the weight of the composition, about 50 ppm by weight or greater or about 100 ppm or greater. The metal salt may be present in the reactive composition in an amount of about 5000 ppm by weight or less based on the weight of the composition, about 3000 ppm by weight or less or about 1000 ppm by weight or less. The metal salt may be present in part a, part b or in a third part. The metal salt may be present in a matrix of a copolymer of one or more vinylidene aromatic monomers. The metal salt may be present in a third part which may include an admixture of other components useful for the final use of the composition as disclosed herein.

The one or more copolymers of one or more vinylidene aromatic monomers and one or more unsaturated compounds containing a nucleophilic group may be present in the reactive composition in an amount of about 90 weight percent or greater based on the weight or the reactive composition, about 95 weight percent or greater or about 99 weight percent or greater. The one or more copolymers of one or more vinylidene aromatic monomers and one or more unsaturated compounds containing a nucleophilic group may be present in the reactive composition in an amount of about 99.9 weight percent or less based on the weight or the reactive composition, about 99.8 weight percent or less or about 99.7 weight percent or less. The one or more copolymers of one or more vinylidene aromatic monomers and one or more unsaturated compounds containing an electrophilic group may be present in the reactive composition in an amount of about 0.05 weight percent or greater based on the weight or the reactive composition, about 0.1 weight percent or greater or about 0.3 weight percent or greater. The one or more copolymers of one or more vinylidene aromatic monomers and one or more unsaturated compounds containing an electrophilic group may be present in the reactive composition in an amount of about 10 weight percent or less based on the weight or the reactive composition, about 8 weight percent or less, of about 5 weight percent or less, or about 0.5 weight percent or less.

Disclosed is a method of preparing chain extended and or branched copolymers of one or more vinylidene aromatic monomers and one or more unsaturated compounds containing a nucleophilic group. The method may comprise contacting one or more copolymers of one or more vinylidene aromatic monomers and one or more unsaturated compounds containing nucleophilic groups with one or more copolymers of one or more vinylidene aromatic monomers and one or more unsaturated compounds having electrophilic groups under conditions such that chain extended and or branched copolymers of one or more vinylidene aromatic monomers and one or more unsaturated compounds containing nucleophilic groups are prepared. The method may comprise contacting the copolymers in the presence of a metal salt. The amounts of the reactants utilized may be those amounts recited herein before.

In an embodiment the composition of copolymers and blowing agent (i.e., foaming composition) are contacted and heated and extruded to form a foam. In the formation of an extruded foam, the foaming composition is heated to a temperature to melt the copolymers at temperatures described herein and cause the copolymers to react and form the chain extended/branched copolymer, wherein at least during a portion of forming the foam the copolymers are mixed with a blowing agent. The blowing agent may be mixed or contacted with copolymers that are reacting any time prior or during the formation of the foam. For example, depending on the type of blowing agent it may be physically mixed or melt incorporated with the copolymers to form the foaming composition prior to heating and extruding to form the foam. The blowing agent may be introduced during the heating and extruding to form the foam. Likewise, any combination of introducing of the blow agent or agents may be used as well as any combination of blowing agents. Desirably, a combination of blowing agents may be used.

Generally, the copolymers may be contacted at a temperature of about 200° C. or greater, or about 220° C. or greater, or about 230° C. or greater. The reactants may be contacted at a temperature of about 300° C. or less, or about 250° C. or less, or about 245° C. or less. The contacting time at the stated temperatures is selected such that chain extended and or branched copolymers of one or more vinylidene aromatic monomers and one or more unsaturated compounds containing nucleophilic groups are prepared during the heating and extruding to form a foam. The contacting time of the reactants may be about 0.5 minutes or greater, about 0.6 minutes or greater or about 0.7 minutes or greater. The contacting time of the reactants may be about 60 minutes or less, about 45 minutes or less or about 30 minutes or less.

When heating and extruding to form the foam, known processes for making an XPS foam may be employed such as those described in U.S. Pat. Nos. 2,669,751; 3,231,524; 3,391,051; 3,368,008; 3,482,006, 4,420,448 and 5,340,844. In a particular embodiment to form the foam, the copolymers are melt blended in a first screw extruder connected in series with a second screw extruder with the first extruder being operated at higher pressures and temperatures than the second extruder. In the first extruder, the copolymers are heated to a temperature sufficient to react to form the chain extended/branched copolymer with the temperature generally being from about 150° C. or 170° C. to about 300° C. or 270° C. The temperature may vary within this range along the length of the extruder as is typical in such processes in smoothly transitioning from one extruder to the other and matching the flow rates of each. The second extruder generally has a high length/diameter to slowly cool the melted polymer before exiting the die to form the extruded polymer foam typically in the form a plank. The second extruder as in the first may vary its temperature over its length and typically the temperature ranges from about 200° C. to about 80° C. The pressure in the first extruder typically ranges from about 100 bar to about 250 bar. The pressure in the second extruder typically ranges from about 20 bar to about 200 bar.

When forming the foam other polymers may be melt blended with the foaming composition such as the commonly used to form XPS foams and may include any compatible with the chain extended/branched copolymer that is formed. Example of other polymers that may be used when forming the foam include any styrenic polymer that is not one of the copolymers of the foaming composition such as polystyrene or substituted polystyrene (e.g., o-methylstyrene, m-methylstyrene, p-methylstyrene, 2,4-dimethylstyrene, 2,5-dimethylstyrene, p-tert-butylstyrene, p-chlorostyrene and the like) or copolymers of styrene and a substituted styrene.

Other additives may be included in the composition such as fire retardants, nucleating agents, flow promoters, process aids, fibers, fillers, UV stabilizers, antioxidants, thermal stabilizers, colorants, etc. The nucleating agents may be any useful for nucleating cells when forming the foam and may any suitable ones such as those known in the art. Exemplary nucleating agents include any useful fine particle, inorganic solids such as talc, metal oxides, silicates, polyethylene waxes, and carbon particulates, fibers, nanotubes or the like in any useful amount. The total amount of other additives generally is from about 0.1% to about 10%, 5% or 3% by weight of the foaming composition. The nucleating agent or any other additive may be added at any time including within the foaming composition prior to be heated or inserted during the heating or extruding when forming the foam.

The foam of this invention is comprised of a chain extended/branched copolymer that is the reaction product of (i) a copolymer of one or more vinylidene aromatic monomers and one or more unsaturated compounds containing nucleophilic groups, the copolymer having on average about 0.02 to about 3.0 percent by weight of nucleophilic groups pendant from the copolymer and (ii) a copolymer of one or more vinylidene aromatic monomers and one or more unsaturated compounds having electrophilic groups as described above. In a particular embodiment it has been discovered that a distinct high molecular weight node is present in the foam compared to a foam, for example, where the copolymer having electrophilic pendant groups are absent with all else being the same (i.e. lacking the chain extended/branched copolymer). Surprisingly, the foams of the present invention may have a lower density while having a compressive strength essentially the same or greater than foams without the chain extended/branched copolymer. In addition, a foam having similar density may be made at higher rates while maintaining the compressive strength of a foam lacking the chain extended/branched copolymer.

The foam may have any amount of open or closed cells. Even so, for some applications a portion of the cells may be advantageously closed, for example, when absorption of water is deleterious to the function of the final product. Even though open or closed foams may be used, when the application desired benefits from lack of water absorption, the foam is preferably closed cell. For such applications, it is preferred, that at least about 55%, more preferably at least about 60%, even more preferably at least about 75% and most preferably at least about 90% of the cells of the foam are closed cells.

Generally, the foam may have a density from about 16 kg/m3 to about 100 kg/m3 or more. The foam density, typically, is selected depending on the particular application, for example, for an exterior building façade or insulating panel, the density is typically is at least about 24 kg/m3 to about 64 kg/m3. The cells of the foam may have an average size (largest dimension) of from about 0.05 to about 5.0 mm, especially from about 0.1 to about 3.0 mm, as measured by ASTM D-3576-98.

Disclosed are the following exemplary illustrative embodiments.

Illustrative Embodiments

The following embodiment are provided to illustrate the invention but are not intended to limit the scope thereof. The invention encompasses and contemplates any and all combinations of the following embodiments including those encompassed in the claims.

1. A foaming composition comprising:
   a) one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer;
   b) one or more copolymers of one or more vinylidene aromatic monomers and one or more unsaturated compounds having electrophilic groups; and
   c) one or more blowing agents.

2. The composition of Embodiment 1 comprising;
   a) from about 90 to about 99.9 weight percent of the copolymer of one or more vinylidene aromatic monomers and one or more unsaturated compounds containing nucleophilic groups;
   b) from about 0.1 to about 10.0 weight percent of the copolymer of one or more vinylidene aromatic monomers and one or more unsaturated compounds containing a electrophilic group groups; and
   c) from about 1.0 to about 12.0 weight percent one or more blowing agents; wherein weight percent is based on the weight of the composition.
3. The composition of Embodiment 1 or 2 containing one or more nucleating agents.
4. The composition of Embodiment 3 wherein the one or more nucleating agents are present in an amount of about 0.1 to about 10 percent by weight of the composition.
5. The composition according to any one of the preceding embodiments wherein the concentration of nucleophilic groups on the copolymer of one or more vinylidene aromatic monomers and one or more unsaturated compounds containing nucleophilic groups, the amount of the a copolymer of one or more vinylidene aromatic monomers and one or more unsaturated compounds containing electrophilic groups and the concentration of electrophilic groups on the copolymer of one or more vinylidene aromatic monomers and one or more unsaturated compounds having pendant electrophilic groups are chosen such that when the copolymers are reacted they form copolymers of one or more vinylidene aromatic monomers and one or more unsaturated compounds containing nucleophilic groups which are branched and or chain extended and are un-crosslinked.
6. The composition according to any one of the preceding embodiments wherein the nucleophilic groups are carboxylic acid, alcohol, phenol, amine, aniline, imidazole, tetrazole, thiol, boronic acid, glycol, hydrazine and hydroxyl amine groups.
7. The composition according to any one of the preceding embodiments wherein the electrophilic groups are one or more of epoxide, anhydride, imide, ester, acyl halide, acyl nitrile, aldehyde, ketone, isocyanate and isothiocyanate groups.
8. The composition according to any one of preceding embodiments wherein the nucleophilic groups are carboxylic acid groups.
9. The composition according to any one of the preceding embodiments wherein the electrophilic groups are one or more of epoxide groups.
10. The composition of any one of the preceding embodiments wherein the composition contains a salt of a transition metal, an alkali metal, an alkaline earth metal, a post transition metal or a metalloid.
11. The composition of Embodiment 10 wherein the metal is zinc, zirconium, aluminum, calcium, sodium, copper, magnesium or mixtures thereof.
12. The composition of Embodiment 10 wherein the transition metal, alkali metal, the earth alkali metal, the post transition metal or the metalloid forms a salt with an acetate, carbonate, bicarbonate, methacrylate, fumarate, stearate or mixtures thereof.
13. The composition of any one of Embodiments 10 to 12 wherein the mole ratio of metal salts to nucleophilic groups on the copolymer of one or more vinylidene aromatic monomers and one or more unsaturated compounds containing nucleophilic groups is about 20:1 to about 1:20.

14. The composition of any one of Embodiments 10 to 13 wherein the mole ratio of metal salts to nucleophilic groups on the copolymer of one or more vinylidene aromatic monomers and one or more unsaturated compounds containing nucleophilic groups is about 10:1 to about 1:10.

15. A foam comprised of a chain extended/branched copolymer that is the reaction product of (i) a copolymer of one or more vinylidene aromatic monomers and one or more unsaturated compounds containing nucleophilic groups, the copolymer having on average about 0.02 to about 3.0 percent by weight of nucleophilic groups pendant from the copolymer and (ii) a copolymer of one or more vinylidene aromatic monomers and one or more unsaturated compounds having electrophilic groups.

16. The foam according to Embodiment 15 wherein the chain extended/branched copolymer is soluble in methylene chloride at 23° C. and exhibits a polydispersity of 2.5 or greater.

17. The foam according to Embodiment 15 or 16 wherein the concentration of nucleophilic groups on the copolymer of one or more vinylidene aromatic monomers and one or more unsaturated compounds containing a nucleophilic group, the amount of the copolymer of one or more vinylidene aromatic monomers and one or more unsaturated compounds having pendant electrophilic groups and the concentration of electrophilic groups on the copolymer of one or more vinylidene aromatic monomers and one or more unsaturated compounds having pendant electrophilic groups are chosen such that the copolymer of one or more vinylidene aromatic monomers and one or more unsaturated compounds containing a nucleophilic group is branched and or chain extended and is un-crosslinked.

18. The foam according to any one of Embodiments 15 to 17 wherein the chain extended and/or branched copolymer contains from about 0.1 to about 25 percent of one or more copolymers of one or more vinylidene aromatic monomers and one or more unsaturated compounds having pendant electrophilic groups.

19. The foam according to any one of Embodiments 15 to 18 wherein the nucleophilic groups are carboxylic acid, alcohol, phenol, amine, aniline, imidazole, tetrazole, thiol, boronic acid, glycol, hydrazine and hydroxyl amine groups.

20. The foam according to any one of Embodiments 15 to 19 wherein the electrophilic groups are one or more of epoxide, anhydride, imide, ester, acyl halide, acyl nitrile, aldehyde, ketone, isocyanate and isothiocyanate groups.

21. The foam according to any one of Embodiments 15 to 20 wherein the nucleophilic groups are carboxylic acid groups.

22. The foam according to any one of Embodiments 15 to 21 wherein the electrophilic groups are one or more of epoxide groups.

23. The foam according to any one of Embodiments 15 to 22 wherein the chain extended and/or branched copolymer exhibits a polymodal molecular weight distribution.

24. The foam according to any one of Embodiments 15 to 23 wherein the $M_z$ is from about 300 kg/mole to about 1,000 kg/mole and the $M_w$ is from about 100 kg/mole to about 400 kg/mole.

25. The foam according to any one of Embodiments 15 to 24 wherein the polydispersity is about 3.2 or greater.

26. The foam according to any one of Embodiments 15 to 25 wherein the one or more unsaturated carboxylic acids comprise acrylic acid, methacrylic acid, 4-vinyl benzoic acid, maleic acid, fumaric acid or mixtures thereof.

27. The foam according to any one of Embodiments 15 to 26 wherein the copolymer comprises one or more impact modifiers.

28. The foam according to any one of Embodiments 15 to 27 wherein the copolymer comprises from about 20 to about 99.5 percent by weight of the chain extended and/or branched copolymer and from about 0.5 to about 50 percent by weight of the impact modifier based on the weight of the composition.

29. The foam according to any one of Embodiments 27 or 28 wherein the copolymer comprises a continuous matrix containing the chain extended and/or branched copolymer and a dispersed phase comprising the impact modifier.

30. The foam according to any one of Embodiments 27 to 29 wherein the impact modifier comprises particles of about 0.05 to about 6.0 microns.

31. The foam according to any one of Embodiments 15 to 30 wherein the foam is an extruded foam sheet.

32. The foam according to any one of Embodiments 15 to 31 wherein the foam is a closed cell foam.

33. The foam according to any one of Embodiments 15 to 31 wherein the foam is an open cell foam.

34. The foam according to any one of Embodiments 15 to 33 wherein the foam is comprised of a coloring agent.

35. The foam according to any one of Embodiments 15 to 34 wherein the foam is comprised of a flame retardant.

36. The foam according to any one of Embodiments 15 to 35 wherein foam is comprised of an ultraviolet light stabilizer.

37. The foam according to Embodiment 32 wherein the closed cells contain the residue of one or more blowing agents.

38. The foam according to any one of Embodiments 15 to 37 wherein the foam is comprised of a nucleating agent.

39. A method of forming a foam comprising:

a) heating (i) a foaming composition comprised of copolymer of one or more vinylidene aromatic monomers and one or more unsaturated compounds containing nucleophilic groups, the copolymer having on average about 0.02 to about 3.0 percent by weight of nucleophilic groups pendant from the copolymer and (ii) a copolymer of one or more vinylidene aromatic monomers and one or more unsaturated compounds having electrophilic groups sufficient to melt said copolymers and cause said copolymers to react and form a chain extended/branched copolymer b) extruding the foaming composition in the presence of a blowing agent from a higher pressure to a lower pressure to form an extruded foam comprised of the chain extended/branched copolymer.

40. The method according to Embodiment 39 wherein the copolymer of one or more vinylidene aromatic monomers and one or more unsaturated compounds having electrophilic groups is present in an amount of from about 0.05 to about 25 percent by weight of the mixture that is melt blended.

41. The method of any one of Embodiments 39 or 40 wherein the heating, extruding or both is performed in the presence of a salt of a transition metal, an alkali metal, an alkaline earth metal, a post transition metal or a metalloid.

42. The method of Embodiment 41 wherein the metal is zinc, zirconium, aluminum, calcium, sodium, copper, magnesium or mixtures thereof.

43. The method of Embodiment 41 or 42 wherein the metal forms a salt with an acetate, carbonate, bicarbonate, (meth)acrylate, fumarate, stearate or mixtures thereof.

44. The method of any one of Embodiments 41 to 43 wherein the mole ratio of metal salts to nucleophilic groups on the copolymer of one or more vinylidene aromatic monomers and one or more unsaturated compounds containing nucleophilic groups is about 20:1 to about 1:20.

45. The method of any one of Embodiments 41 to 43 wherein the mole ratio of metal salts to nucleophilic groups on the copolymer of one or more vinylidene aromatic monomers and one or more unsaturated compounds containing nucleophilic groups is about 10:1 to about 1:10.

46. The method of any one of Embodiments 39 to 45 wherein the copolymers heating is at a temperature of about 150° C. to about 270° C. for a time period of about 0.5 to about 3.0 minutes.

47. The method of any one of Embodiments 41 to 46 wherein the metal salt is present at a concentration of about 50 ppm to about 5000 ppm based on the weight of the copolymers reacted.

48. The method of any one of Embodiments 39 to 47 wherein the temperature of the mixture during heating and extruding to form the foam is from 80° C. to 270° C.

49. The method of any one of Embodiments 39 to 51 wherein the blowing agent comprises one or more of a physical blowing agent or chemical blowing agent.

50. The method of Embodiment 49, wherein the physical blowing agent is one or more of fluorochlorocarbons, fluorocarbons, hydrocarbons, alcohols, ketones, ethers, water, carbon dioxide, nitrogen, argon, or ammonia.

51. The method of Embodiment 49, wherein the chemical blowing agent is one or more of sodium bicarbonate or azodicarbonamide.

52. The method of any one of Embodiments 39 to 49 wherein the blowing agent is present in an amount of about 0.1 to about 15 percent by weight based on the foaming composition.

53. The method of any one of Embodiments 39 to 50, wherein the foaming composition is comprised of a nucleating agent in an amount greater than 0 weight percent to 10 weight percent by weight of the foaming composition.

EXAMPLES

The following examples are provided to illustrate the invention, but are not intended to limit the scope thereof. All parts and percentages are by weight unless otherwise indicated.

Ingredients:

1. XZ94002: styrene acrylic acid copolymer having 500 ppm acrylic acid.
2. JONCRYL 4400: Styrene glycidyl methacrylate copolymer containing about 30 percent of glycidyl methacrylate (available from BASF Corporation).
3. STYRON™ 650 HF: polystyrene having a melt flow index (MFI) of 46 at 200° C./5 kg (available from Trinseo SA).
4. Zn Acetate MB: (15% Zn Acetate in STYRON™ 660 a polystyrene having an MFI of 7 at 200° C./5 kg available from Trinseo SA, in which Zn acetate powder was mixed with STYRON™ 660 using a twin screw compounding extruder at 200° C.)
5. Flame retardant
6. Blowing Agents: $CO_2$, isobutane, dimethyl ether (DME) fed at the following rates
   a. $CO_2$ as shown in Table 1
   b. DME at 2.5 kg/hr
   c. Isobutane at 0.50 kg/hr
7. Nucleation Agent: talc
8. Colorants
9. Recycle: Recycled polystyrene foam.

The foams are made using two extruders in series. The first extruder is a twin screw extruder. The second extruder is a single screw extruder. In the first extruder the dosing is 1000 kg/hour and is likewise fed to the second extruder as they are positioned in series. The line speed is 11 meters/minute. The first extruder was run at the following: screw speed about 167 rpm; temperature about 190° C.; and Specific energy about 0.120 kWh/kg; Residence time about 5 minutes. The pressure varied from about 170 bar to about 176 bar.

The second extruder had a screw rpm of about 6.7. The temperature ranged from a temperature at the beginning of the extruder of about 70° C. to 100° C. to cool the extrudate from the first extruder. The temperature is then raised to about 160° C. and then cooled to a temperature ranging from 110° C. to 55° C. at the end of the extruder where the foam is extruded through a die to form the extruded polystyrene foam, with the middle of extruder typically having a temperature of about 89° C. The specific energy was about 0.020 kWh/kg. The pressures ranged from about 153 bar at the beginning of the extruder to about 26 bar at the end of the extruder just prior to exiting from the die orifice.

Comparative Example 1 was made in the same manners as described above.

Example 1 was produced in the same manner as above, but a slight increase in pressure in the first extruder was noted, which was due to the increase viscosity at low shears of the melted composition.

Example 2 was produced in the same manner as above, but a further slight increase in extruder pressure was noted in the same manners as Example 1.

Example 3's foam procedure deviated from the above procedure slightly by increasing the $2^{nd}$ extruder midzone temperature by about 2° C., which allowed the pressure at the exit of the $2^{nd}$ extruder be maintained as described above, which was due to the increased viscosity due to the chain extension realized in the present invention. Likewise, the line speed was increased to 11.8 meters/minute, allowing the blowing of a lower density foam still having suitable properties such as compressive strength. Likewise, this indicates that increased production rates on the order of about 5.5% could be realized.

Example 4's procedure was further altered by increasing the mid zone temperature of the $2^{nd}$ extruder by about 2° C.

over the temperature in Example 3's procedure. The exit pressure of the $2^{nd}$ extruder also increased to about 72 bar. This caused a further reduction in density.

Example 5's procedure had a line speed of 11.8 meters/minute. The pressure just prior to exiting the second extruder at these line speeds was about 79 bar.

Example 6 and 7's procedure was essentially the same as described above for Comparative Example 1.

The Comparative Example and Example formulations are shown in Table 1. The amount of each ingredient is the amount by parts by weight. The foam density and molecular weight of the polymer determined by GPC as described herein of the Comparative Examples and Example foams are shown in Table 2.

Figure 2:
FIG. 2 is a GPC molecular weight distribution curve for a foam of this invention.

The complex viscosity of the Comparative Example and Examples were measured at 200° C. using an Anton Paar MCR 302 rheometer with air circulated oven using a PP25 measuring cell at a measuring gap of 1.000 mm. Prior to measuring, the samples were dried at 80° C. for two hours. The measurement procedure was as follows. The oven was set at 200° C. and the cell was set at "zero gap" and then set to 20 mm. The sample was added and the gap was change to the measurement gap stopping at a gap of 1.025 mm to allow for trimming of excessive sample material. Upon reaching the measurement gap of 1.000 mm, the test was commenced with a test sweep being performed for 10 weight distribution curves shown in FIGS. 1 and 2, which correspond to Comparative Example 1 and Example 5. The GPC curve of Example 5 clearly shows a high molecular tail not present in the GPC curve of Comparative Example 1. In addition, there was no cross-linked fraction in Example 5 (i.e. all of the polymer was dissolved and measured when performing GPC).

TABLE 1

| Ingredients | C. Ex. 1 | Ex. 1 | Ex. 2 | Ex. 3 | Ex. 4 | Ex. 5 | Ex. 6 | Ex. 7 |
|---|---|---|---|---|---|---|---|---|
| XZ94002 | 75 | 75 | 75 | 75 | 75 | 75 | 75 | 35 |
| STYRON 650HF | 20 | 20 | 20 | 20 | 20 | 20 | 20 | 20 |
| Zn acetate MB | 0 | 0 | 0 | 0 | 0 | 0.1 | 0.2 | 0.1 |
| Talc | 0.8 | 0.8 | 0.8 | 0.8 | 0.8 | 0.8 | 0.8 | 0.8 |
| $CO_2$ | 3.2 | 3.2 | 3.2 | 3.2 | 3.2 | 3.2 | 3.5 | 3.5 |
| JONCRYL | 0 | 0.2 | 0.4 | 0.4 | 0.4 | 0.4 | 0.4 | 0.2 |
| Recycle | 0 | 0 | 0 | 0 | 0 | 0 | 0 | 40 |
| Line speed m/min | 11.0 | 11.0 | 11.0 | 11.0 | 11.0 | 11.8 | 11.0 | 11.0 |

TABLE 2

| Characteristic | C. Ex. 1 | Ex. 1 | Ex. 2 | Ex. 3 | Ex. 4 | Ex. 5 | Ex. 6 | Ex. 7 |
|---|---|---|---|---|---|---|---|---|
| Density (kg/m³) | 32.2 | 32 | 31.8 | 31 | 30.5 | 29.8 | 31.7 | 32.4 |
| Compressive Strength (N/mm2) | 0.367 | 0.405 | 0.38 | 0.375 | 0.36 | 0.33 | 0.41 | 0.44 |
| $M_w$ | 183700 | 177100 | 190700 | 191600 | 191200 | 217000 | 220400 | 192800 |
| $M_n$ | 55500 | 50200 | 54700 | 54800 | 54700 | 56300 | 55300 | 51100 |
| $M_w/M_n$ | 3.31 | 3.53 | 3.49 | 3.5 | 3.5 | 3.85 | 3.99 | 3.77 |
| $M_z$ | 338400 | 339300 | 373400 | 375700 | 372700 | 493200 | 515000 | 417600 |
| Viscosity Ratio | 18.7 | | | 31.2 | | 58.6 | 58.7 | 24.6 |
| Viscosity (Pa · s) @ 0.314 rad/s | 2185 | | | 3850 | | 7030 | 7610 | 2785 |
| Viscosity (Pa · s) @ 628 rad/s | 117 | | | 123.5 | | 120 | 129.5 | 113 |

$M_n$ = number average molecular weight
$M_w$ = weight average molecular weight
$M_z$ = z average molecular weight minutes at an oscillation of 10 rad/s. Then, the test was performed by sweeping from 628 rad/s down to 0.3 rad/s recording 25 measuring points with a log distribution. The measurement shows that at low shears (i.e., angular frequency) the complex viscosity of the Examples are substantially higher as given by the viscosity ratio at 0.314 rad/s:614 rad/s.

The compressive strengths were determined after 45 days of aging and determined as per ASTM D1621.

From Table 2 it is evident that the Example foams may be made at higher lines speeds while still maintaining sufficient compressive strength and ability to make useable foams at higher production rates. The Examples likewise display an increased viscosity at low shears when measuring complex viscosity (i.e. low frequency) yet have low viscosities at high shears on the order of like polystyrene composition without the chain extension seen in the present invention. This is particularly shown by the viscosity ratio which increases for all the Examples compared to the Comparative Examples while having essentially the same high shear viscosity, which is believed to be due to a high molecular weight tail. This is further shown in the GPC molecular

What is claimed is:

1. A foaming composition comprising:
(a) one or more copolymers having nucleophilic groups, prepared from one or more vinylidene aromatic monomers and one or more unsaturated compounds containing the nucleophilic groups, the one or more copolymers having nucleophilic groups have on average 0.02 to less than 0.25 percent by weight of nucleophilic groups pendant from the one or more copolymers having nucleophilic groups;
(b) one or more copolymers having electrophilic groups, prepared from one or more vinylidene aromatic monomers and one or more unsaturated compounds having electrophilic groups, wherein the one or more copolymers having electrophilic groups are present in an amount of 0.1 to about 0.5 percent by weight of the foaming composition; and
(c) one or more blowing agents,
wherein the nucleophilic groups of the one or more copolymers having nucleophilic groups and the electrophilic groups of the one or more copolymers having electrophilic groups react and form branched and/or chain extended and un-crosslinked copolymers during a process of forming a foam from the foaming composition; and wherein the branched and/or chain extended and un-crosslinked copolymers are soluble in methylene chloride at 23° C. and exhibit a polydispersity of 2.5 or greater.

2. The foaming composition according to claim 1 wherein the nucleophilic groups are one or more of carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

3. The foaming composition according to claim 1 wherein the nucleophilic groups are carboxylic acid groups and the electrophilic groups are epoxide groups.

4. The foaming composition according to claim 1, wherein the one or more copolymers having the electrophilic groups contain about 10 to about 60 percent by weight of the electrophilic groups.

5. The foaming composition according to claim 1, wherein the branched and/or chain extended and un-crosslinked copolymers have a $M_z$ from about 300 kg/mole to about 1,000 kg/mole and a $M_w$ from about 100 kg/mole to about 400 kg/mole and a viscosity ratio, low shear viscosity at 0.314 s$^{-1}$/higher shear viscosity at 628 s$^{-1}$, of about 25 or greater.

6. The foaming composition of claim 1, wherein the foaming composition comprises a zinc salt selected from the group consisting of zinc acetate, zinc acetate dihydrate and zinc carbonate.

7. The foaming composition of claim 6, wherein the zinc salt is present in an amount of about 10 ppm to about 5000 ppm by weight or less based on the weight of the foaming composition.

8. The foaming composition of claim 1 which comprises a zinc salt in which zinc forms a salt with an acetate, carbonate, bicarbonate, methacrylate, fumarate or mixtures thereof.

9. A method of forming a foam comprising:

a) heating a foaming composition comprising one or more copolymers having nucleophilic groups prepared from of one or more vinylidene aromatic monomers and one or more unsaturated compounds containing the nucleophilic groups, the one or more copolymers having nucleophilic groups have on average about 0.02 to less than 0.25 percent by weight of nucleophilic groups pendant from the one or more copolymers having nucleophilic groups; one or more copolymers having electrophilic groups prepared from one or more vinylidene aromatic monomers and one or more unsaturated compounds having the electrophilic groups, wherein the one or more copolymers having electrophilic groups are present in an amount of 0.1 to about 0.5 percent by weight of the foaming composition; and one or more blowing agents, to a temperature sufficient to melt and react the one or more copolymers having nucleophilic groups and the one or more copolymers having electrophilic groups to form a branched and/or chain extended and un-crosslinked copolymers; and b) extruding the foaming composition from a higher pressure to a lower pressure to form an extruded foam comprised of the branched and/or chain extended and un-crosslinked copolymers; and wherein the branched and/or chain extended and un-crosslinked copolymers are soluble in methylene chloride at 23° C. and exhibit a polydispersity of 2.5 or greater.

10. The method according to claim 9 wherein the nucleophilic groups are one or more of carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

11. The method of claim 9 wherein the composition contains a salt comprising a salt of a metalloid or a metal salt, the metal salt being a transition metal, an alkali metal, an alkaline earth metal, or a post transition metal.

12. The method of claim 11 wherein the metal salt is a zinc salt in which zinc forms a salt with an acetate, carbonate, bicarbonate, methacrylate, fumarate or mixtures thereof.

13. The method of claim 12, wherein the zinc salt is zinc acetate, zinc acetate dihydrate or zinc carbonate.

14. The method of claim 13 wherein the zinc salt is present in an amount of about 10 ppm to about 5000 ppm by weight or less based on the weight of the foaming composition.

15. The method of claim 9, wherein the one or more copolymers having the electrophilic groups contain about 10 to about 60 percent by weight of the electrophilic groups.

16. The method according to claim 9 wherein the nucleophilic groups are carboxylic acid groups and the electrophilic groups are epoxide groups.

17. A foam comprised of a branched and/or chain extended and un-crosslinked copolymer that is a reaction product of a foaming composition comprising (i) one or more copolymers having nucleophilic groups prepared from one or more vinylidene aromatic monomers and one or more unsaturated compounds containing the nucleophilic groups, the one or more copolymers have on average about 0.02 to less than 0.25 percent by weight of nucleophilic groups pendant from the one or more copolymers having nucleophilic groups and (ii) one or more copolymers having electrophilic groups prepared from one or more vinylidene aromatic monomers and one or more unsaturated compounds having the electrophilic groups, wherein the one or more copolymers having electrophilic groups are present in an amount of 0.1 to about 0.5 percent by weight based on the weight of the foaming composition; and wherein the branched and/or chain extended and un-crosslinked copolymer is soluble in methylene chloride at 23° C. and exhibits a polydispersity of 2.5 or greater.

18. The foam of claim 17, wherein the foam comprises a zinc salt in which zinc forms a salt with an acetate, carbonate, bicarbonate, methacrylate, fumarate or mixtures thereof.

19. The foam of claim 18, wherein the zinc salt is zinc acetate, zinc acetate dihydrate or zinc carbonate.

20. The foam of claim 17, wherein the branched and/or chain extended and un-crosslinked copolymer has a $M_z$ from about 300 kg/mole to about 1,000 kg/mole and a $M_w$ from about 100 kg/mole to about 400 kg/mole and a viscosity ratio, low shear viscosity at 0.314 s$^{-1}$/higher shear viscosity at 628 s$^{-1}$, of about 25 or greater.

* * * * *